United States Patent
Guo et al.

(10) Patent No.: US 8,813,545 B2
(45) Date of Patent: Aug. 26, 2014

(54) METHOD FOR DIAGNOSING COMPONENT FAILURE IN A SADDLE-TYPE FUEL TANK ASSEMBLY

(71) Applicant: Delphi Technologies, Inc., Troy, MI (US)

(72) Inventors: Yichao Guo, Auburn Hills, MI (US); Kenneth Simpson, Swartz Creek, MI (US); James W. Jeffers, Linden, MI (US)

(73) Assignee: Delphi Technologies, Inc., Troy, MI (US)

( * ) Notice: Subject to any disclaimer, the term of this patent is extended or adjusted under 35 U.S.C. 154(b) by 30 days.

(21) Appl. No.: 13/733,981

(22) Filed: Jan. 4, 2013

(65) Prior Publication Data

US 2014/0190246 A1    Jul. 10, 2014

(51) Int. Cl.
*G01M 15/00*         (2006.01)

(52) U.S. Cl.
USPC ........................................... 73/114.54

(58) Field of Classification Search
USPC ........................................... 73/114.54
See application file for complete search history.

(56) References Cited

U.S. PATENT DOCUMENTS

| 4,773,260 | A  | * | 9/1988 | Ohno et al. | 73/114.54 |
| 6,230,558 | B1 | * | 5/2001 | Miwa et al. | 73/201 |
| 6,666,084 | B2 | * | 12/2003 | Schelhas et al. | 73/290 R |
| 8,401,761 | B2 | * | 3/2013 | Bohr et al. | 701/102 |

\* cited by examiner

*Primary Examiner* — Freddie Kirkland, III
(74) *Attorney, Agent, or Firm* — Lawrence D. Hazelton

(57) ABSTRACT

A method for diagnosing a component failure in a saddle-type fuel tank assembly is provided. The method includes a) updating a maximum amount to a subsequent amount of fuel if the subsequent amount of fuel is greater than the maximum amount, b) updating a minimum amount to the subsequent amount of fuel if the subsequent amount of fuel is less than the minimum amount, c) determining a fuel consumption amount, and d) determining that one or more of a first fuel level sender and a second fuel level sender have failed if the difference between the maximum amount and minimum amount is less than a first threshold, and the fuel consumption amount is greater than a second threshold.

4 Claims, 6 Drawing Sheets

METHOD FOR DIAGNOSING COMPONENT FAILURE IN A SADDLE-TYPE FUEL TANK ASSEMBLY

TECHNICAL FIELD OF INVENTION

This disclosure generally relates to a method for diagnosing a component failure in a fuel tank assembly, and more particularly to diagnosing a component failure in a saddle-type fuel tank assembly.

BACKGROUND OF INVENTION

The use of saddle-type fuel tanks to increase fuel tank storage capacity in rear drive shaft vehicles is well known. The saddle-type fuel tank shape defines a first chamber and a second chamber for storing fuel. Typically, the fuel pump is located in the first chamber and fuel stored in the second chamber is transferred to the first chamber via a transfer pump. A first fuel level sender is configured to measure the fuel level in the first chamber, and a second fuel level sender is configured to measure the fuel level in the second chamber. A signal from each of the senders varies in proportion to the fuel level of the respective first or second chambers. A controller monitors the first and second fuel level sender signals in order to calculate the amount of fuel in the tank. If one of the fuel level senders malfunctions, the signal provided by the malfunctioning sender may not accurately represent the fuel level in the respective chamber causing the controller to calculate and provide an erroneous fuel amount to the engine control system and the instrument panel fuel gauge. An erroneous fuel amount indication may cause the engine control system to malfunction in regards to emission control. An erroneous fuel gauge reading may lead to a vehicle running out of fuel and stalling unexpectedly due to the vehicle operator being unaware of the need to refuel the vehicle. In addition, if the transfer pump fails and doesn't transfer fuel from the second chamber to the first chamber, the vehicle may stall unexpectedly due to the first chamber running out of fuel prematurely. Therefore, it is desirable to be able to diagnose these failures as soon as possible in order to provide adequate warning to the vehicle operator of a failed fuel system component and the corresponding need to service the vehicle.

SUMMARY OF THE INVENTION

In accordance with one embodiment, a method for diagnosing a component failure in a saddle-type fuel tank assembly is provided. The method comprises the step of determining an initial amount of fuel in the fuel tank. The method further comprises the step of storing the initial amount of fuel as a maximum amount and a minimum amount. The method further comprises the step of determining a subsequent amount of fuel in the fuel tank after determining the initial amount of fuel. The method further comprises updating the maximum amount to the subsequent amount of fuel if the subsequent amount of fuel is greater than the maximum amount. The method further comprises updating the minimum amount to the subsequent amount of fuel if the subsequent amount of fuel is less than the minimum amount. The method further comprises the step of determining a fuel consumption amount. The method further comprises the step of determining that one or more of a first fuel level sender and a second fuel level sender have failed if the difference between the maximum amount and minimum amount is less than a first threshold, and the fuel consumption amount is greater than a second threshold.

In accordance with another embodiment, a method for diagnosing a component failure in the saddle-type fuel tank assembly is provided. The method comprises the step of incrementing a fail accumulator value and a sample accumulator value if a second signal is not within a threshold range defined by a first signal. The method further comprises incrementing the sample accumulator value, if the second signal is within the threshold range. The method further comprises determining that a component has failed if the fail accumulator value is greater than a first threshold. The method further comprises determining that the component has not failed if the sample accumulator value is greater than a second threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
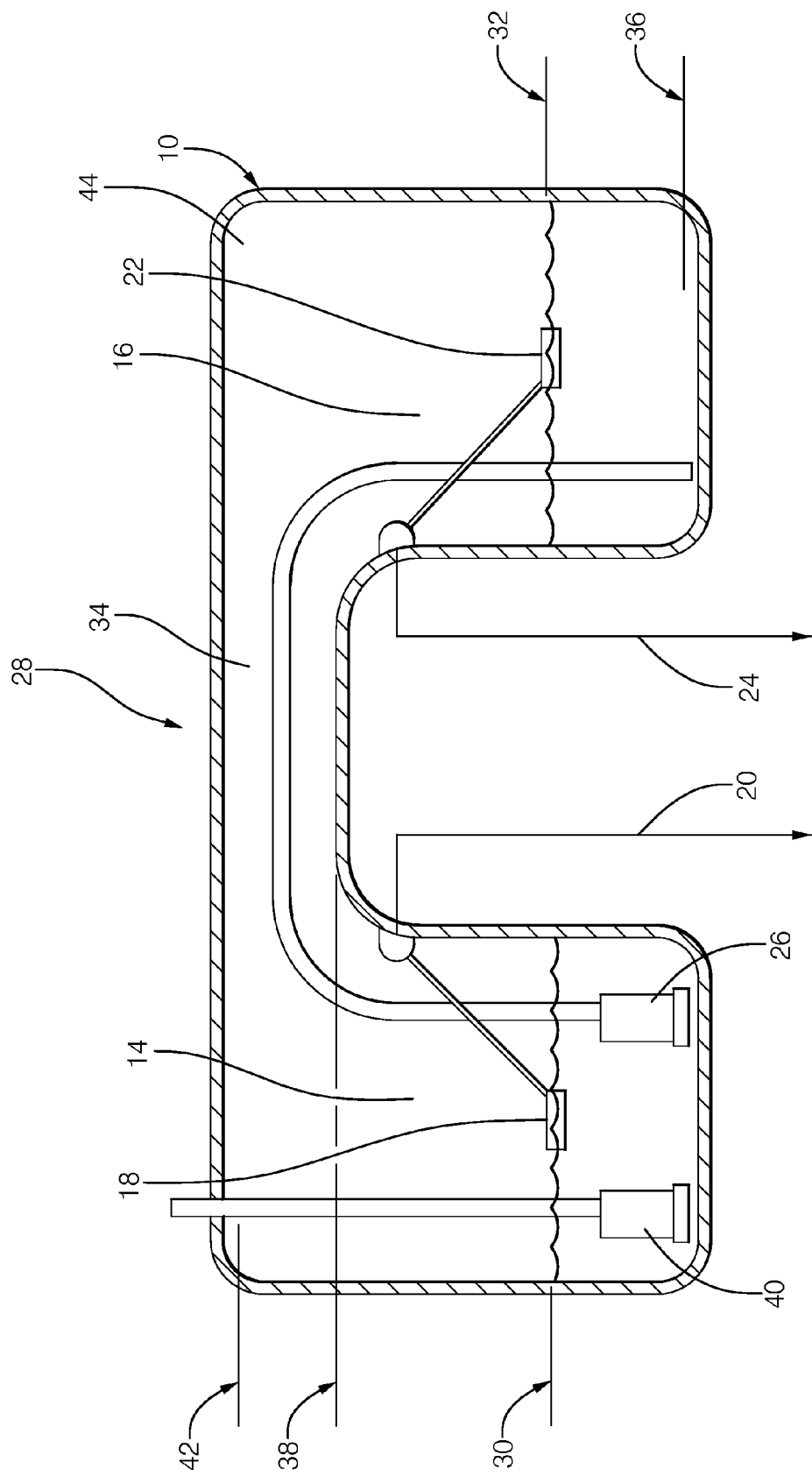
FIG. 1 is an illustration showing a non-limiting example of a saddle-type fuel tank assembly.

FIG. 1 illustrates a non-limiting example of a saddle-type fuel tank assembly 28. The saddle type fuel tank assembly 28 comprises a fuel tank 10 that has a "saddle bag like" shape. In general, the fuel tank 10 defines a first chamber 14, a second chamber 16, and a connecting chamber 34. A first fuel level sender 18 is configured to provide a first signal 20 indicative of a first fuel level 30 in the first chamber 14, and a second fuel level sender 22 is configured to provide a second signal 24 indicative of a second fuel level 32 in the second chamber 16. The design for the first fuel level sender 18 and second fuel level sender 22 is well known and typically comprises a float and rod whose movement varies the resistance of a resistive element in the fuel level sender.

The first chamber 14 contains a fuel pump 40 and a transfer pump 26 which is configured to transfer fuel from the second chamber 16 to the first chamber 14. The connecting chamber 34 allows fuel to flow freely between the first chamber 14 and the second chamber 16 when the first fuel level 30 or the second fuel level 32 is greater than a connecting chamber bottom level 38 determined by the connecting chamber 34, and prevents fuel from flowing freely between the first chamber 14 and the second chamber 16 when the first fuel level 30 and the second fuel level 32 are less than the connecting chamber bottom level 38.

The second signal 24 indicates a minimum fuel level 36 when the second chamber 16 is substantially empty. As used herein, substantially empty means the second fuel level 32 is at or below the lowest level that the second fuel level sender 22 can measure. The first signal 20 and the second signal 24 indicate a maximum fuel level 42 when the fuel tank 10 is substantially full of fuel. As used herein, substantially full of fuel means the first fuel level 30 and the second fuel level 32 are at or above the highest level that both the first fuel level sender 18 and second fuel level sender 22 can measure. A nominal fuel capacity 44 for the fuel tank 10 is defined by the volume of fuel in the fuel tank 10 when the first fuel level 30 and the second fuel level 32 are at the maximum fuel level 42.

Figure 2:
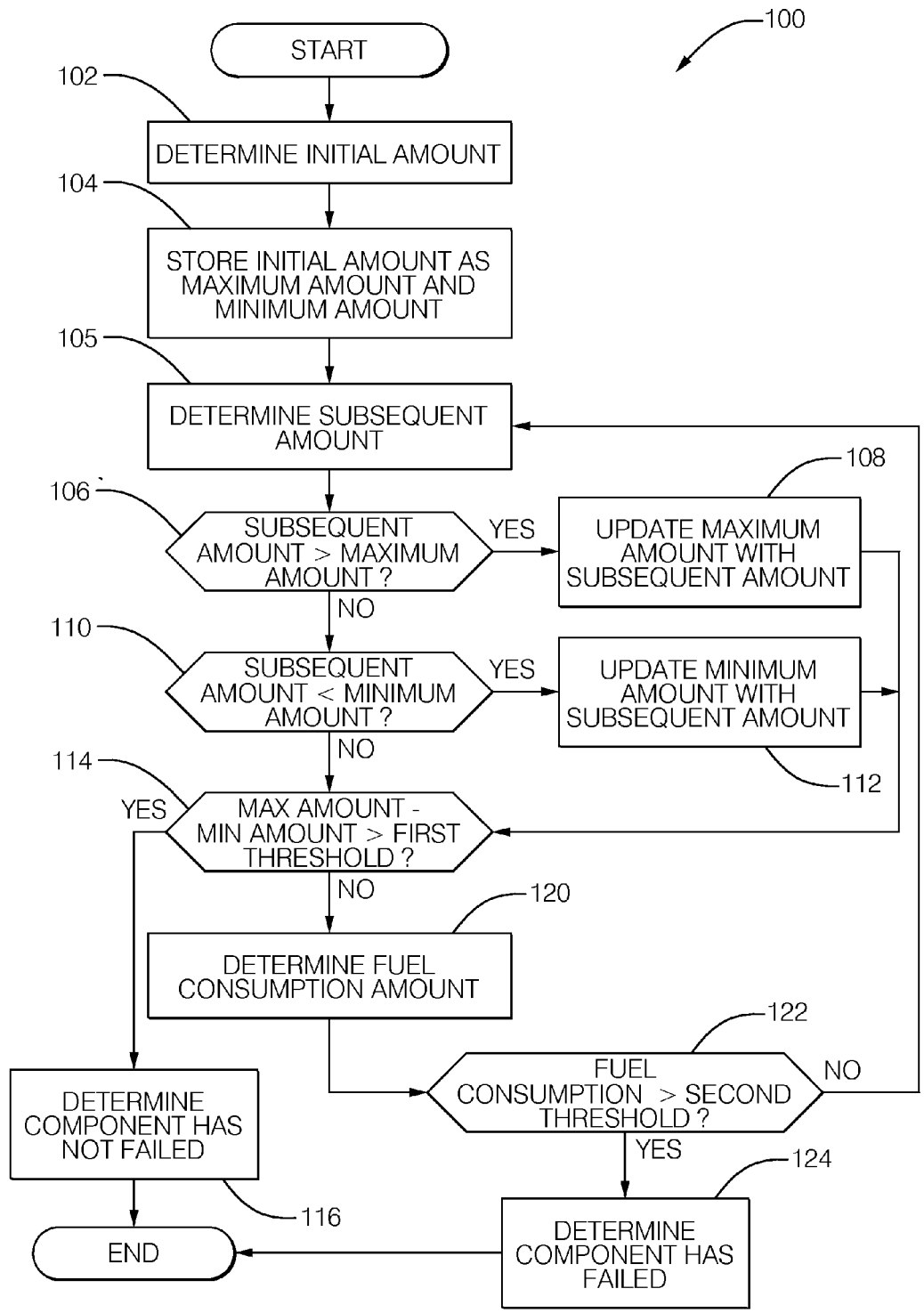
FIG. 2 is a flow chart showing a method for diagnosing a component failure in the saddle-type fuel tank assembly shown in FIG. 1 in accordance with one embodiment.

FIG. 2 illustrates an embodiment of a method 100 for diagnosing a component failure in the saddle-type fuel tank assembly 28. The method 100 may be continuously executed by an on-board vehicle controller (not shown). The method 100 is described below starting with step 102.

Step 102, DETERMINE INITIAL AMOUNT, includes determining an initial amount of fuel in the fuel tank 10. The initial amount of fuel may be determined based on the first signal 20 and the second signal 24.

Step 104, STORE INITIAL AMOUNT AS MAXIMUM AMOUNT AND MINIMUM AMOUNT, includes storing the initial amount of fuel as a maximum amount and a minimum amount.

Step 105, DETERMINE SUBSEQUENT AMOUNT, includes determining a subsequent amount of fuel in the fuel tank 10, after determining the initial amount of fuel. The subsequent amount of fuel may be determined based on the first signal 20 and the second signal 24.

Step 106, SUBSEQUENT AMOUNT>MAXIMUM AMOUNT?, includes determining if the subsequent amount of fuel is greater than the maximum amount. If yes, the method 100 proceeds to step 108. If no, the method 100 proceeds to step 110.

Step 108, UPDATE MAXIMUM AMOUNT WITH SUBSEQUENT AMOUNT, includes updating the maximum amount to the subsequent amount of fuel.

Step 110, SUBSEQUENT AMOUNT<MINIMUM AMOUNT?, includes determining if the subsequent amount of fuel is less than the minimum amount. If yes, the method 100 proceeds to step 112. If no, the method 100 proceeds to step 114.

Step 112, UPDATE MINIMUM AMOUNT WITH SUBSEQUENT AMOUNT, includes updating the minimum amount to the subsequent amount of fuel.

Step 114, MAXIMUM AMOUNT−MINIMUM AMOUNT>FIRST THRESHOLD?, includes determining if the difference between the maximum amount and the minimum amount is greater than a first threshold. If yes, the method 100 proceeds to step 116. If no, the method proceeds to step 120. The first threshold is typically set at 5 to 10 percent of the nominal fuel capacity 44 in order to ensure that fuel lever sender noise alone does not cause the difference to exceed the first threshold.

Step 116, DETERMINE COMPONENT HAS NOT FAILED, includes determining that the first fuel level sender 18 and the second fuel level sender 22 have not failed. For example, the first fuel level sender 18 and the second fuel level sender 22 are not mechanically "stuck" in one position and move in accordance with changes in the fuel level.

Step 120, DETERMINE FUEL CONSUMPTION AMOUNT, includes determining a fuel consumption amount. The fuel consumption amount is typically determined based on accumulating the amount of fuel injected by the fuel injectors.

Step 122, FUEL CONSUMPTION AMOUNT>SECOND THRESHOLD, includes determining if the fuel consumption amount is greater than a second threshold. If yes, the method 100 proceeds to step 124. If no, the method 100 proceeds to step 105 to determine a subsequent amount of fuel in the fuel tank 10. The second threshold typically is empirically determined and comprises a high value and a low value. For example, the high value may be approximately 35% of the nominal fuel capacity 44, and the low value may be approximately 20% of the nominal fuel capacity 44. The purpose of the high value is to avoid "false fails" due to the lack of significant fuel level sender movement when the fuel tank 10 is "over-fueled" past the nominal fuel capacity 44 (i.e. when the level of fuel in the fuel tank 10 is greater than the level of fuel capable of being measured by the first fuel level sender 18 and the second fuel level sender 22). The high value is typically utilized when the subsequent amount of fuel is above approximately 85% of the nominal fuel capacity 44, and the low value is typically utilized when the subsequent amount of fuel is below approximately 70% of the nominal fuel capacity 44. When the subsequent amount of fuel is between approximately 70 and 85%, the high value is typically utilized unless the low value was utilized in the most recent second threshold comparison in step 122. As used herein, approximately means within +/−5 percentage points.

Step 124, DETERMINE COMPONENT HAS FAILED, includes determining that one or more of the first fuel level sender 18 and the second fuel level sender 22 have failed. For example, the first fuel level sender 18 and/or the second fuel level sender 22 are mechanically "stuck" in one position and do not move in accordance with changes in the fuel level.

Figure 3:
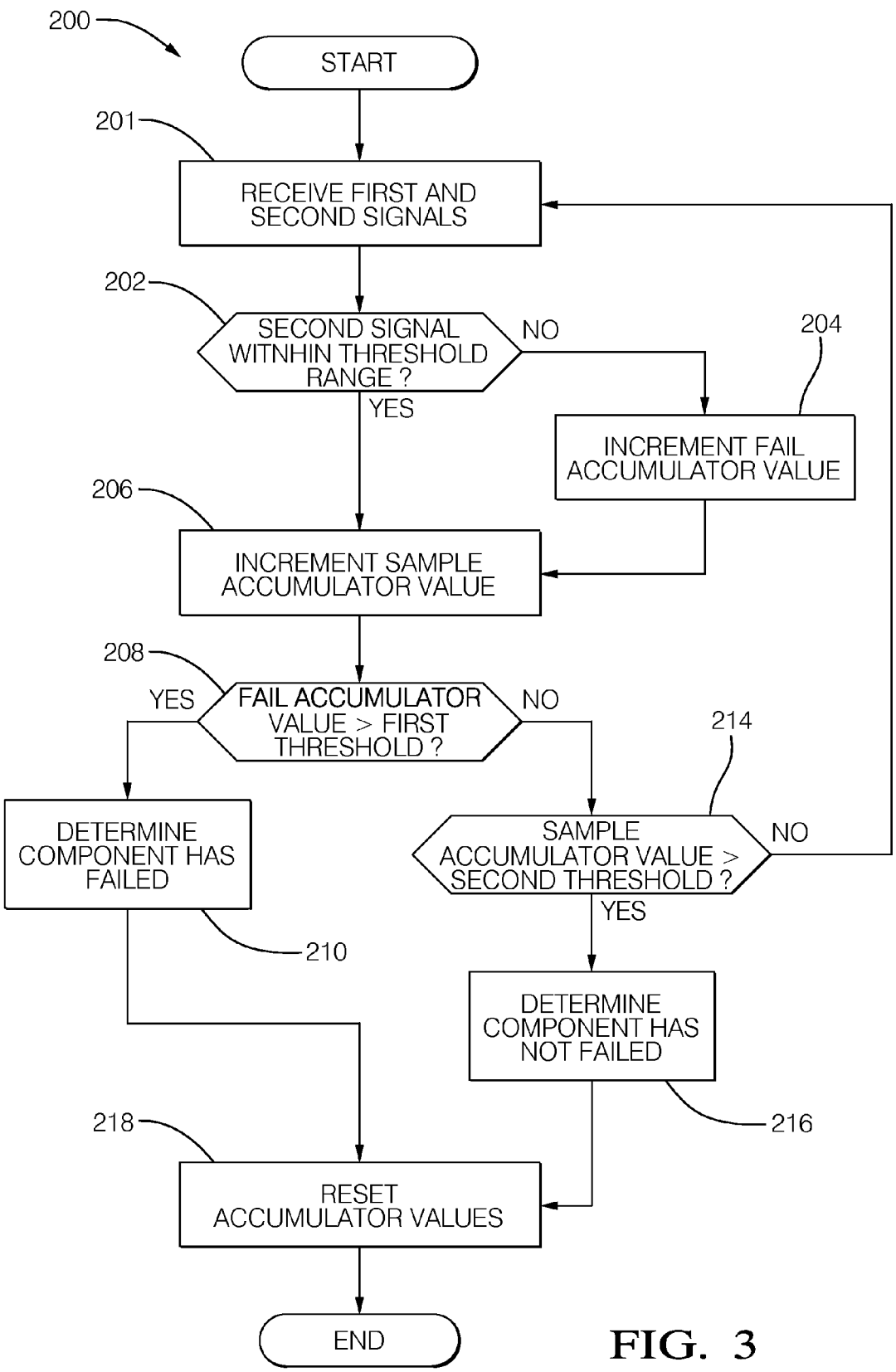
FIG. 3 is a flow chart showing a method for diagnosing a component failure in the saddle-type fuel tank assembly shown in FIG. 1 in accordance with one embodiment.

FIG. 3 illustrates an embodiment of a method 200 for diagnosing a component failure in the saddle-type fuel tank assembly 28. The method 200 may be continuously executed by an on-board vehicle controller (not shown). The method 200 is described below starting with step 201.

Step 201, RECEIVE FIRST AND SECOND SIGNAL, includes receiving the first signal 20 and the second signal 24.

Step 202, SECOND SIGNAL WITHIN THRESHOLD RANGE, includes determining if the second signal 24 is within a threshold range defined by the first signal 20. If yes, the method 200 proceeds to step 206. If no, the method 200 proceeds to step 204. The threshold range may be determined based on an expectation that the second fuel level 32 is substantially equal to the first fuel level 30 when the first fuel level 30 is greater than the connecting chamber bottom level 38, and the expectation that the second fuel level 32 is less than or substantially equal to the first fuel level 30 when the first fuel level 30 is less than the connecting chamber bottom level 38. This is because the transfer pump 26 is either pumping fuel from the second chamber 16 to the first chamber 14 causing the second fuel level 32 to be less than the first fuel level 30 or siphoning fuel back to the second chamber when turned off. As used herein, substantially means within the range of empirically determined fuel level variation caused by factors such as changes in vehicle motion or vehicle orientation.

Step 204, INCREMENT FAIL ACCUMULATOR VALUE, includes incrementing a fail accumulator value.

Step 206, INCREMENT SAMPLE ACCUMULATOR VALUE, includes incrementing a sample accumulator value.

Step 208, FAIL ACCUMULATOR>FIRST THRESHOLD?, includes determining if the fail accumulator value is greater than a first threshold. If yes, the method 200 proceeds to step 210. If no, the method 200 proceeds to step 214. The value for first threshold may be empirically determined such that changes in the first fuel level 30 and second fuel level 32 caused by sudden changes in vehicle motion (e.g. vehicle hitting bump in road) do not cause false fails.

Step 210, DETERMINE COMPONENT HAS FAILED, includes determining that a component has failed. For example, the transfer pump 26 may be "plugged" or the first fuel level sender 18 or the second fuel level sender 22 may be mechanically "stuck" in one position.

Step 214, SAMPLE ACCUMULATOR VALUE>SECOND THRESHOLD?, includes determining if the sample accumulator value is greater than a second threshold. Typically, the value for the second threshold is double the value of the first threshold.

Step 216, DETERMINE COMPONENT HAS NOT FAILED, includes determining that the component has not failed.

Step 218, RESET ACCUMULATOR VALUES, includes resetting the fail accumulator value and the sample accumulator value to the starting conditions for the method 200.

Figure 4:
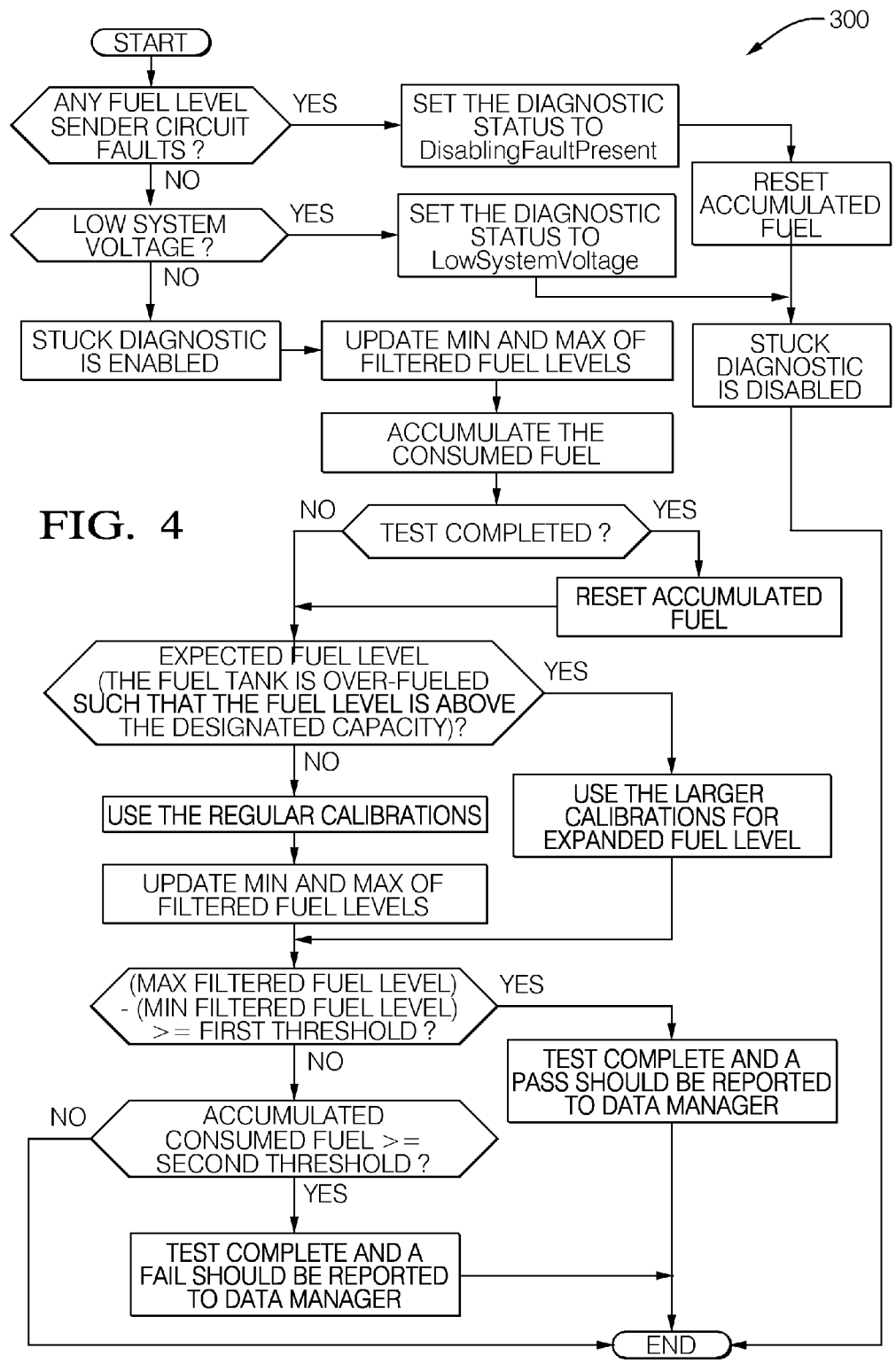
FIG. 4 is a flow chart showing a method for diagnosing a component failure in the saddle-type fuel tank assembly shown in FIG. 1 in accordance with one embodiment.

FIG. 4 illustrates an embodiment of a method 300 for diagnosing a component failure in the saddle-type fuel tank assembly 28. The method 300 includes the step of checking the first fuel level sender 18 and second fuel level sender 22 for circuit faults such as short or open circuits. The method 300 also includes the step of checking the supply voltage to the first fuel level sender 18 and second fuel level sender 22 for abnormalities such as low voltage.

Figure 5A:
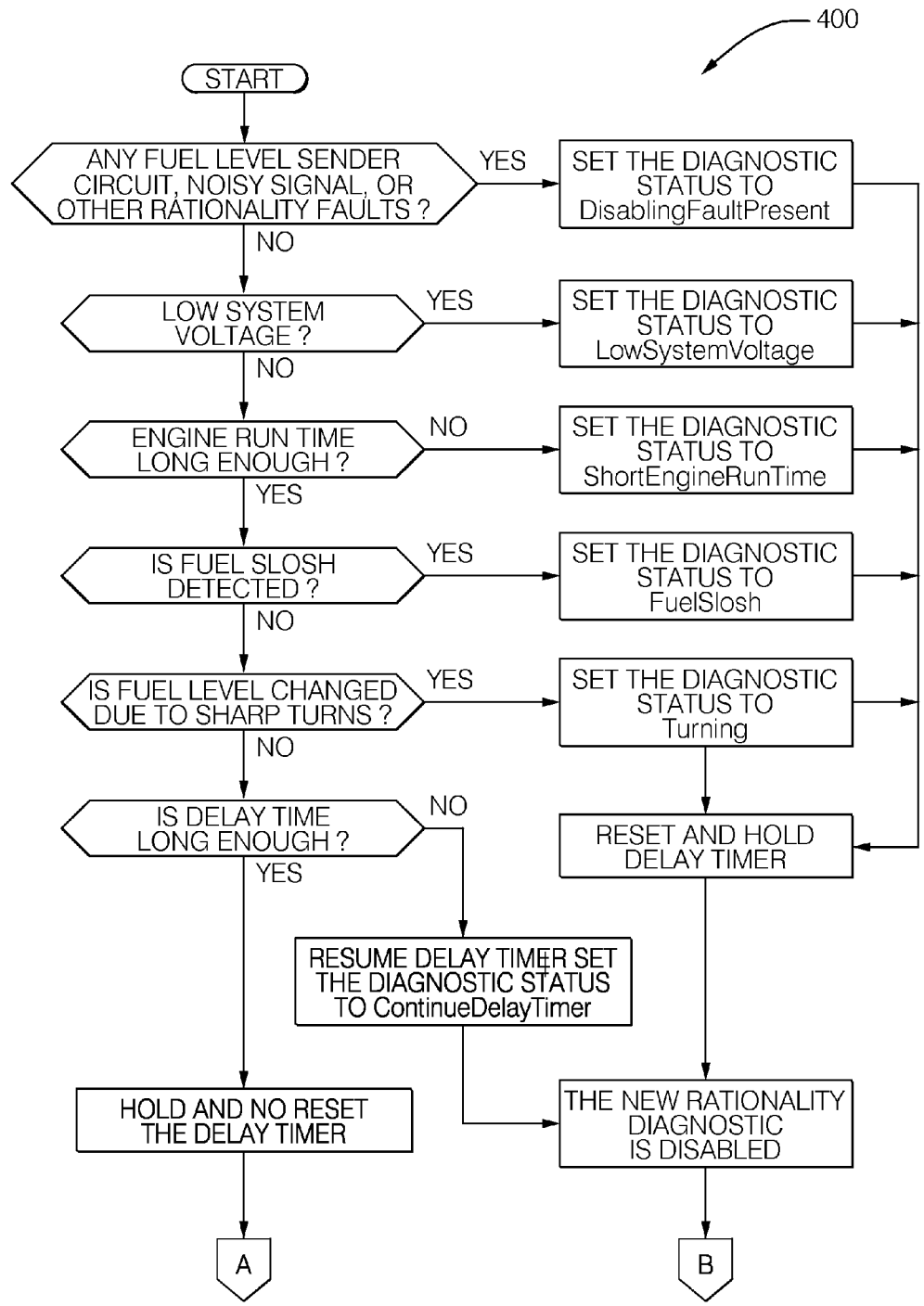
FIGS. 5A and 5B combined form a flow chart showing a method for diagnosing a component failure in the saddle-type fuel tank assembly shown in FIG. 1 in accordance with one embodiment.
Figure 5:
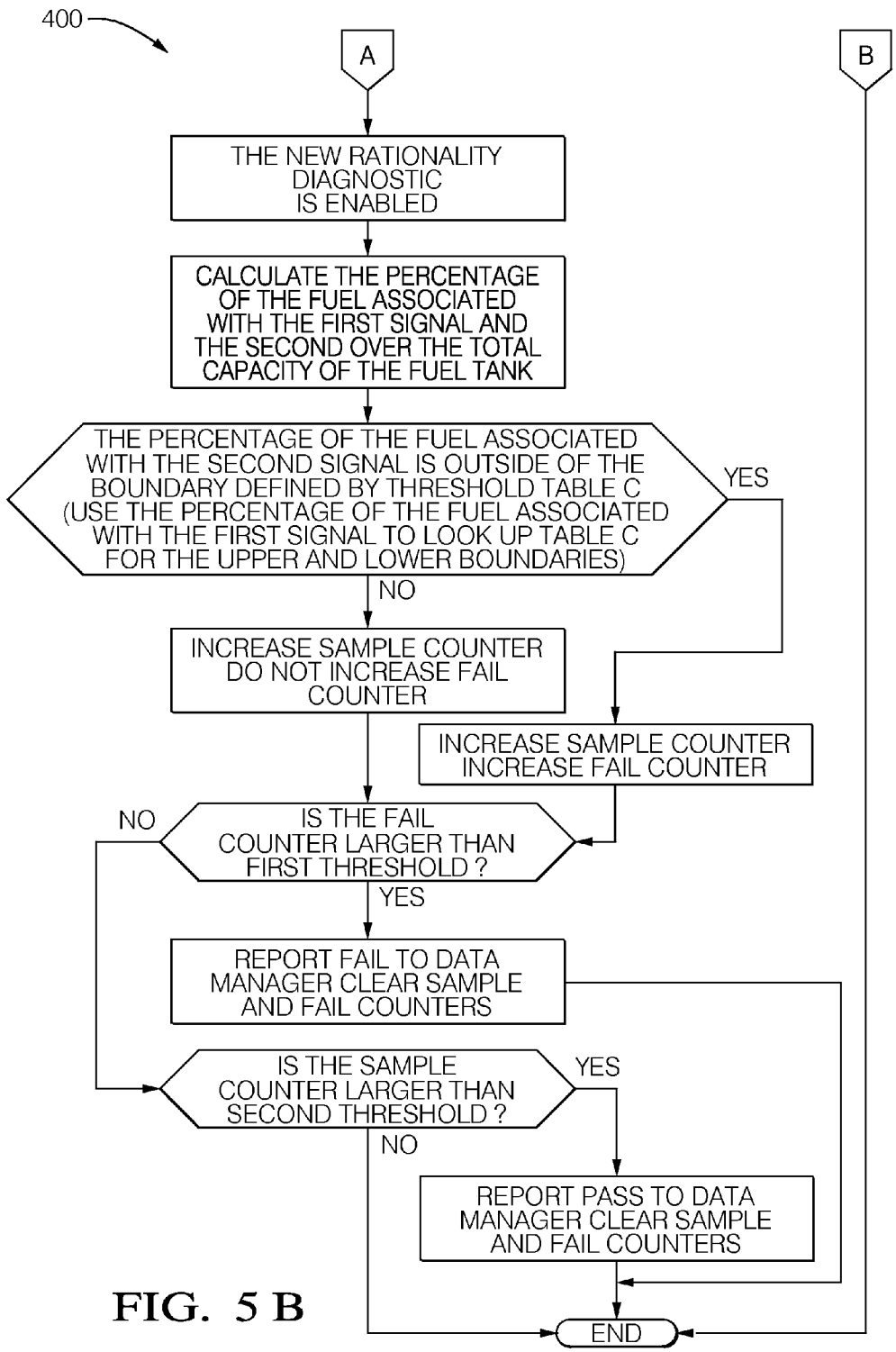

FIG. 5 illustrates an embodiment of a method 400 for diagnosing a component failure in the saddle-type fuel tank assembly 28. The method 400 includes the step of disabling the method 400 when the first fuel level 30 and the second fuel level 32 are not relatively stable. For example, when fuel is sloshing in the fuel tank 10 due to sudden changes in vehicle motion caused by hard braking or sharp turns.

Accordingly, a method for diagnosing a component failure in the saddle-type fuel tank assembly 28 is provided.

While this invention has been described in terms of the preferred embodiments thereof, it is not intended to be so limited, but rather only to the extent set forth in the claims that follow.

We claim:

1. A method for diagnosing a component failure in a saddle-type fuel tank assembly, said assembly comprising a fuel tank that defines a first chamber and a second chamber, a first fuel level sender configured to provide a first signal indicative of a first fuel level in the first chamber, and a second fuel level sender configured to provide a second signal indicative of a second fuel level in the second chamber, said method comprising:

determining an initial amount of fuel in the fuel tank;
storing the initial amount of fuel as a maximum amount and a minimum amount;
determining a subsequent amount of fuel in the fuel tank after determining the initial amount of fuel;
updating the maximum amount to the subsequent amount of fuel if the subsequent amount of fuel is greater than the maximum amount;
updating the minimum amount to the subsequent amount of fuel if the subsequent amount of fuel is less than the minimum amount;
determining a fuel consumption amount; and
determining that one or more of the first fuel level sender and the second fuel level sender have failed if the difference between the maximum amount and minimum amount is less than a first threshold, and the fuel consumption amount is greater than a second threshold.

2. The method of claim 1, wherein the method further comprises determining that the first fuel level sender and the second fuel level sender have not failed if the difference between the maximum amount and the minimum amount is greater than the first threshold.

3. The method of claim 1, wherein the first threshold is distinct from the second threshold.

4. The method of claim 1, wherein the initial amount of fuel and the subsequent amount of fuel are determined based on the first signal and the second signal.

\* \* \* \* \*